(12) United States Patent
Borg

(10) Patent No.: US 6,798,904 B2
(45) Date of Patent: Sep. 28, 2004

(54) IDENTIFYING COLOR PROCESSING MODULES

(75) Inventor: Lars U. Borg, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 734 days.

(21) Appl. No.: 09/747,670

(22) Filed: Dec. 21, 2000

(65) Prior Publication Data

US 2002/0081021 A1 Jun. 27, 2002

(51) Int. Cl.[7] .................................................. G06K 9/00
(52) U.S. Cl. ..................... 382/167; 382/162; 358/518; 358/519; 358/520
(58) Field of Search ................................ 382/162, 167; 358/518, 519, 520, 521, 522, 523, 3.01, 3.02, 3.03, 3.04, 3.06, 3.07, 3.08, 3.09, 3.1, 3.11, 3.12, 3.13, 3.14, 3.15, 3.16, 3.17, 3.18, 3.19, 3.2, 3.21, 3.22, 3.23, 1.9; 345/596, 690, 691, 692, 693, 694, 695, 696, 697

(56) References Cited

U.S. PATENT DOCUMENTS

| | | | | |
|---|---|---|---|---|
| 6,011,540 A | * | 1/2000 | Berlin et al. ................. | 345/601 |
| 6,072,901 A | * | 6/2000 | Balonon-Rosen et al. .. | 382/167 |
| 6,362,808 B1 | * | 3/2002 | Edge et al. ................. | 345/601 |
| RE38,180 E | * | 7/2003 | Edge ........................... | 347/19 |
| 6,642,931 B1 | * | 11/2003 | Haikin et al. ............... | 345/601 |

* cited by examiner

Primary Examiner—Bhavesh M. Mehta
Assistant Examiner—Ali Bayat
(74) Attorney, Agent, or Firm—Fish & Richardson P.C.

(57) ABSTRACT

Methods and apparatuses, including computer program products for generating a plurality of color processing module fingerprints are described. A set of input colors represented in an input color space is generated. Sets of output colors represented in an output color space are generated, wherein each set of output colors is generated by transforming the set of input colors using a respective one of a plurality of color processing modules. A new color is iteratively added to the set of input colors and the plurality of sets of output colors is regenerated when each set of output colors does not uniquely identify its corresponding color processing module. Each set of output colors is identified as a color processing module fingerprint when each set of output colors uniquely identifies its corresponding color processing module.

24 Claims, 3 Drawing Sheets

| Row number | Input | | | Output | | | | | | | | | | | | | | | | |
|---|---|---|---|---|---|---|---|---|---|---|---|---|---|---|---|---|---|---|---|---|
| | Reference | | | Adobe CMM | | | Agfa CMM | | | Heidelberg CMM | | | Kodak CMM | | | Apple CMM | | |
| | L | A | B | R | G | B | R | G | B | R | G | B | R | G | B | R | G | B |
| 1 | 90 | 0 | 0 | 229 | 228 | 227 | 226 | 227 | 228 | 229 | 229 | 229 | 227 | 227 | 227 | 226 | 227 | 228 |
| 2 | 50 | 0 | 0 | 121 | 120 | 119 | 118 | 119 | 120 | 123 | 123 | 123 | 120 | 120 | 120 | 118 | 120 | 120 |
| 3 | 10 | 0 | 0 | 29 | 28 | 127 | 26 | 28 | 28 | 28 | 28 | 28 | 29 | 28 | 28 | 27 | 28 | 29 |
| 4 | 60 | 127 | 0 | 255 | 0 | 27 | 255 | 0 | 128 | 28 | 0 | 131 | 255 | 0 | 127 | 255 | 0 | 128 |
| 5 | 50 | 127 | 127 | 255 | 0 | 0 | 255 | 0 | 21 | 255 | 0 | 0 | 255 | 0 | 0 | 255 | 0 | 0 |
| 6 | 50 | 0 | 127 | 141 | 118 | 0 | 138 | 118 | 0 | 144 | 121 | 0 | 140 | 118 | 0 | 139 | 118 | 0 |
| 7 | 50 | -127 | 0 | 0 | 155 | 0 | 0 | 155 | 0 | 0 | 159 | 0 | 0 | 155 | 0 | 0 | 155 | 0 |
| 8 | 50 | -127 | -127 | 0 | 156 | 116 | 0 | 156 | 117 | 0 | 160 | 120 | 0 | 156 | 116 | 0 | 156 | 117 |
| 9 | 50 | -127 | 127 | 0 | 165 | 255 | 0 | 165 | 255 | 0 | 169 | 255 | 0 | 165 | 255 | 0 | 165 | 255 |
| 10 | 50 | 0 | -127 | 0 | 132 | 255 | 0 | 132 | 255 | 0 | 135 | 255 | 0 | 132 | 255 | 0 | 132 | 255 |
| 11 | 50 | 127 | -127 | 218 | 0 | 255 | 215 | 0 | 255 | 223 | 0 | 255 | 216 | 0 | 255 | 214 | 0 | 255 |

FIG. 3

IDENTIFYING COLOR PROCESSING MODULES

BACKGROUND

This invention relates to computer applications with color processing capabilities. Computer applications with color processing capabilities, such as Illustrator®, Photoshop®, or Acrobat®, all available from Adobe Systems Incorporated of San Jose, Calif., use different types of Color Management Systems (CMS's). A CMS is a collection of software tools designed to accurately represent the colors in an image regardless of whether the image is viewed in different applications, viewed on different monitors, or printed on different color printers.

The software tool in a CMS that is responsible for performing the color conversion calculations from one device's color space to another device's color space is called a color processing module, and one example of such a module is a color management module (CMM). Many different types of CMMs exist and manufacturers that produce commonly used CMMs include Heidelberg, Kodak, Agfa, Apple, Adobe. Each CMM converts colors according to the preferences of its manufacturer.

Many users of computer applications with color processing capabilities are not concerned about which CMM an application uses, but to advanced users it can be very important to know. For example, when an animated movie is made by a number of different subcontractors that are each responsible for a different scene in the movie, it is important that all the subcontractors use the same CMM. If the different subcontractors use different CMMs, the colors of objects may change between the different scenes created by the different subcontractors in the final movie, resulting in an aesthetically unpleasing final cut.

Unfortunately applications do not always indicate which CMM they use. When a user selects a preferred CMM, some applications use the selected CMM only for some color conversions, but not for all color conversions. Consequently, a user of the application has no ability to determine which CMM is used. Advanced users, need a method for verifying that the application really uses the selected CMM for all of its color conversions.

SUMMARY

In general, in a first aspect, the invention provides methods and apparatus, including computer program products, for generating color processing module fingerprints. A set of input colors represented in an input color space is generated. Sets of output colors represented in an output color space are generated, wherein each set of output colors is generated by transforming the set of input colors using a respective one of a plurality of color processing modules. A new color is iteratively added the set of input colors and the plurality of sets of output colors is regenerated when each set of output colors does not uniquely identify its corresponding color processing module. Each set of output colors is identified as a color processing module fingerprint when each set of output colors uniquely identifies its corresponding color processing module.

Advantageous implementations can include one or more of the following features. The initial set of input colors may be a null set. The initial set of input colors can be a random set of colors sampling the input color space. The set of input colors used to generate the plurality of sets of color processing fingerprints is referred to as a fingerprint generating set. The fingerprint generating set can comprise the smallest set of input colors that can generate a color processing module fingerprint for each of the plurality of color processing modules. The fingerprint generating set may only comprise colors from the set of input colors that are not identically transformed by each of the plurality of color processing modules. The color processing modules can be color management modules.

In general, in a second aspect, the invention provides methods and apparatus, including computer program products, for identifying a computer application's color processing module. A fingerprint generating set and a plurality of color processing module fingerprints are received. A test color set is generated by transforming the fingerprint generating set using the application's color processing module and the application's color processing module is identified by comparing the generated test color set with the plurality of color processing module fingerprints.

Advantageous implementations can include one or more of the following features. Identifying the application's color processing module may comprise finding an exact match between the test color set and one of the color processing module fingerprints. Identifying the application's color processing module may comprise finding a best match between the test color set and one of the color processing module fingerprints. Finding a best match between the test color set and one of the color processing module fingerprints can comprise finding a minimum Euclidean distance between the test color set and one of the color processing module fingerprints. Identifying the application's color processing module may comprise determining whether each color in the test color set has a color value that lies within a predetermined tolerance from the color value of a corresponding color in one of the color processing module fingerprints. The predetermined tolerance is a single digital count on either side of the color value of the corresponding color in one of the color processing module fingerprints.

The invention can be implemented to realize one or more of the following advantages. The invention enables an end-user to determine what color processing module a computer application program uses. The color processing module can be an application, a color management module, color processing settings within an application, or a specific rendering intent.

The details of one or more embodiments of the invention are set forth in the accompanying drawings and the description below. Other features and advantages of the invention will be apparent from the description and drawings, and from the claims.

DESCRIPTION OF DRAWINGS

FIG. 3 is a table with an input color set and several output color sets for different color management modules.

Like reference symbols in the various drawings indicate like elements.

DETAILED DESCRIPTION

Figure 1:
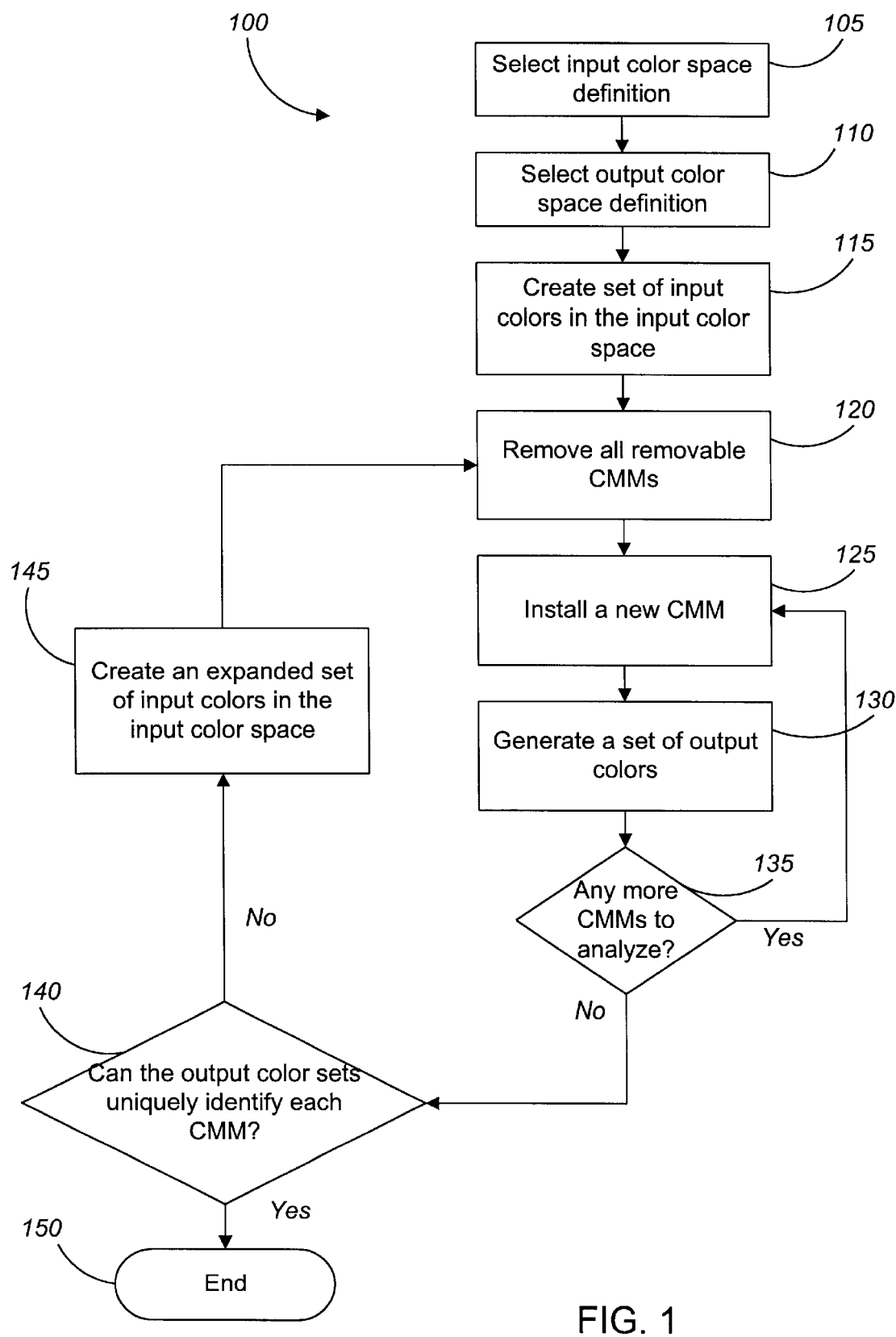
FIG. 1 is a flowchart showing the process of generating a plurality of color management module fingerprints and a fingerprint generating set according to one implementation of the invention.

As shown in FIG. 1, a process 100 generates a plurality of color management module fingerprints and a fingerprint generating set according to a first aspect of the invention. Throughout this application, a fingerprint refers to a set of colors that can uniquely identify an associated color processing module. In other words, fingerprints and color processing modules have a one-to-one correspondence, like the correspondence between a human fingerprint and a particular individual. Although the following description uses a color management module (CMM) as an example, it should be understood that the same process could be used for generating a plurality of fingerprints for any type of color processing module. For example, different applications, such as Photoshop® 5, Photoshop® 6, and Quark Express, may generate different fingerprints when the same color settings are selected in each application's menu. In this situation, the applications themselves can constitute the different color processing modules, and each be associated with a fingerprint. Similarly, when an application allows different color settings to be chosen, the process can be used to generate a plurality of fingerprints corresponding to the application's different color parameter settings. In this case, the application's color parameter settings constitute the different color processing modules. The process can also be used to identify rendering intents by generating a plurality of fingerprints corresponding to different rendering intents. In this case, the rendering intents constitute the different color processing modules. A color processing module could also be a lossy compression and decompression module such as jpeg or DCT filter. The invention can identify which one of multiple compression parameter settings were used when compressing a set of color values.

The process 100 begins by receiving a user input indicating the input color space definition that is supported by the application or suite of applications for which CMM identification is needed (step 105). Colors can be numerically described in several different color models. A few examples of color models are RGB (red, green, blue), HLS (hue, lightness, saturation), CMYK (cyan, magenta, yellow, black) and Lab (lightness, a, b). The input color space is a particular version of a color model with a specific color gamut (range of colors). For example, within the RGB color model, there are a number of color spaces like Apple RGB, Adobe RGB, and sRGB. Each color space defines color by using the RGB model, but the color spaces differ in their color gamuts as well as in other specific characteristics. After the input color space definition has been selected, the process receives user input specifying an output color space that is supported by the application or suite of applications (step 110).

The process then creates an input color set (step 115). The color values in the input color set are selected from the input color space. The number of colors in the input color set may vary depending on the application that is tested.

When the input color set has been determined the process temporarily removes all removable CMMs (step 120) so that they are inaccessible. After removing all removable CMMs, the process reselects one of the CMMs (step 125). If the application has a built-in CMM that could not be removed, the process uses the built-in CMM as the first selected CMM. The CMMs that are selected at step 125 are presumed to be able to override any built-in CMM. However, if a particular application has a built-in CMM that cannot be overridden, the process cannot generate any CMM fingerprints for that application.

After selecting a CMM and enabling the application to use it, the process uses the application to convert or "translate" the input color set to an output color set in an output color space using the selected CMM (step 130). Each color in the output color set thus has a corresponding color in the input color set. The output color set is labeled with the name of the CMM. The built-in CMM is considered a CMM just like any other CMM and is labeled "built-in." When an output color set has been generated for the selected CMM, the process checks if there are any more CMMs left to analyze (step 135). If so, the process deselects the current CMM and repeats steps 125–135 until there are no more CMMs left to analyze. For each CMM that is analyzed, the name of the CMM and the CMM output color set are added as columns to a table. After output color sets have been generated for all the CMMs, the process continues by checking if each generated output color set can uniquely identify its corresponding CMM (step 140). If each generated output color set can uniquely identify its corresponding CMM in step 140, a fingerprint for each CMM has been obtained and the process ends (step 150). The input color set that was used to successfully generate the CMM fingerprints is referred to as the fingerprint generating set. If the generated output color sets cannot uniquely identify their corresponding CMMs in step 140, the process adds more colors to expand the input color set (step 145), and repeats steps 120–145, until they can.

The fingerprint generating set and the CMM fingerprints may contain redundant information that can be removed to obtain a smallest possible CMM fingerprint generating set and smallest possible CMM fingerprints. This may be the case if a large initial input color set is used. In order to find the smallest possible fingerprint generating set and CMM fingerprints, the process examines the fingerprint generating set and the output color sets to see if there is any color in the input color set that is identically transformed by all the CMMs. If such a color can be found, it is removed from the fingerprint generating set and its corresponding color is removed from each output color set. The process also examines the fingerprint generating set and the output color sets to see if there is any color in the fingerprint generating set that is transformed to a unique output color by each CMM. If such a color exists, it alone will be a sufficient fingerprint generating set, and its corresponding output colors will serve as one color fingerprints for their corresponding CMMs.

A convenient way to store the fingerprint generating set (final input color set) and the CMM fingerprint sets (final output color sets) is in the form of a table. An example of such a table is shown in FIG. 3, where the second column from the left is an input color set in the "Lab" color space, and the columns to its right are output color sets in the RGB color space generated by transforming the input color set by the CMMs indicated in the first row of the table. The table has several rows (rows 2, 3, 6 and 11) in which each CMM produces a unique output color for a given input color. The input color in any one of these rows can serve as a single element fingerprint generating set and the output colors on the same row can serve as single element fingerprints for their respective CMMs. Of course the fingerprint generating set and the CMM fingerprints do not need to be represented in a table. Any data structure capable of holding the input color set can be used to store both the fingerprint generating set, and the CMM fingerprints. A few examples include arrays, records, and linked lists.

Figure 2:
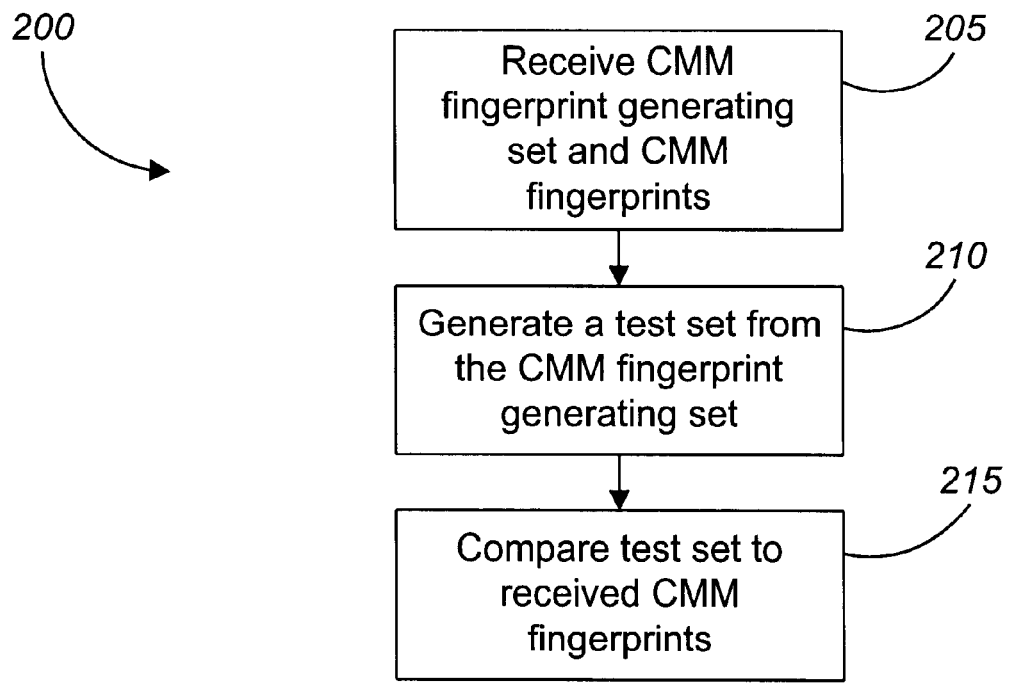
FIG. 2 is flowchart showing the process of identifying an unknown color management module using a plurality of color management module fingerprints and a fingerprint generating set according to one implementation of the invention.

As shown in FIG. 2, a process 200 can use a fingerprint generating set and a plurality of fingerprints to identify a color management module in a computer application program according to a second aspect of the invention. The identification process 200 receives a fingerprint generating set and a number of CMM fingerprints (step 205). For example, the application can receive the fingerprint generating set and fingerprints as a table of the type shown in FIG. 3. The identification process generates a test color set by transforming the received fingerprint generating set to the output color space using the application's unknown CMM (step 210). The process then compares the test color set and the received CMM fingerprints (step 215) to identify the unknown CMM. When there is an identical match between the test color set and a CMM fingerprint, the unknown CMM is identified as the CMM corresponding to the matching fingerprint.

Alternatively, the unknown CMM can be identified as the CMM corresponding to the fingerprint that best matches the test color set. The best match identification process is useful when the user knows that the unknown CMM is one of a limited number of CMMs, for which CMM fingerprints have been received. The best match identification procedure is also useful when round-off errors occur in the numerical representation of the colors. Round-off errors can occur, for example, when dithering is used in an application. In the best match identification procedure, an unknown CMM is identified as the CMM corresponding to a specific fingerprint when each color in the test color set has a color value that lies within a predetermined tolerance from the color value of a corresponding color in the known CMM fingerprint. The tolerance may be a single digital count, or more, where a single digital count represents a change of +/−1 in the least significant bit (LSB) of the numerical representation of the color.

In the above description, the processes have been discussed in relation to different manufacturers' CMMs. However, the processes are equally useful for identifying different versions of one manufacturer's CMMs as the transformations employed by the CMM are changed or improved, or as operating parameters are changed to reconfigure the CMMs. Additionally, in the above description, the CMM fingerprinting and identification methods have been discussed based on applications applying a single CMM color transformation. However, some computer applications use more than one CMM along the different stages of the workflow, which results in compound transformations. The methods described above are equally useful for identifying applications applying more than one CMM color transformation. When generating a fingerprint table for such applications, instead of selecting and applying a single CMM (step 125 in FIG. 1), a combination of CMMs is selected and applied, and the process checks whether all possible combinations of CMMs have been analyzed in step 135. When the fingerprint table is used to identify a combination of CMMs, the fingerprint generating set and the generated fingerprints represent a specific combination of CMMs instead of a single CMM.

The invention can be implemented in digital electronic circuitry, or in computer hardware, firmware, software, or in combinations of them. The methods of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. For example, not all steps in the methods described above must be carried out automatically by a computer or other apparatus, or in the order disclosed. The input color set in the input color space may be an electronic image, the output color sets in the output color space can be printed paper copies of the electronic image, one copy for each selected CMM, and the testing of whether each output color set uniquely identifies the associated color processing module can be done by a person visually comparing the colors in the different printouts. The person can then determine whether a different electronic image having more input colors needs to be selected. This alternative method may however not be sensitive enough to detect subtle differences, and yield the best results when the differences in output between different CMMs are known to be large. Accordingly, other embodiments are within the scope of the following claims.

What is claimed is:

1. A method for generating a plurality of color processing module fingerprints, the method comprising:

using a plurality of color processing modules to generate from a set of input colors represented in an input color space a plurality of sets of output colors represented in an output color space, wherein each set of output colors represents a respective one of the plurality of color processing modules;

testing the plurality of sets of output colors to determine whether each set of output colors can uniquely identify the color processing module that was used to generate that set of output colors, thereby acting as a color processing fingerprint; and until each set of output colors can uniquely identify the color processing module that was used to generate that set of output colors:

adding a new color to the set of input colors;

using the plurality of color processing modules to regenerate the plurality of sets of output colors from the set of input colors; and retesting the plurality of sets of output colors to determine whether each set of output colors can uniquely identify the color processing module that was used to regenerate that set of output colors.

2. The method of claim 1, wherein the initial set of input colors is a random set of colors sampling the input color space.

3. The method of claim 1, wherein the set of input colors used to generate the plurality of sets of color processing fingerprints is a fingerprint generating set.

4. The method of claim 3, wherein the fingerprint generating set comprises the smallest set of input colors that can generate a color processing module fingerprint for each of the plurality of color processing modules.

5. The method of claim 3, wherein the fingerprint generating set only comprises colors from the set of input colors that are not identically transformed by each of the plurality of color processing modules.

6. The method of claim 1, wherein the color processing modules are color management modules.

7. A method for identifying a computer application's color processing module, the method comprising:

receiving a fingerprint generating set and a plurality of color processing module fingerprints;

generating a test color set by transforming the fingerprint generating set using the application's color processing module; and identifying the application's color processing module by comparing the generated test color set with the plurality of color processing module fingerprints.

8. The method of claim 7, wherein identifying the application's color processing module comprises finding an exact match between the test color set and one of the color processing module fingerprints.

9. The method of claims 8, wherein finding a best match between the test color set and one of the color processing module fingerprints comprises finding a minimum Euclidean distance between the test color set and one of the color processing module fingerprints.

10. The method of claim 7, wherein identifying the application's color processing module comprises finding a best match between the test color set and one of the color processing module fingerprints.

11. The method of claim 7, wherein identifying the application's color processing module comprises determining whether each color in the test color set has a color value that lies within a predetermined tolerance from the color value of a corresponding color in one of the color processing module fingerprints.

12. The method of claim 11, wherein the predetermined tolerance is a single digital count on either side of the color value of the corresponding color in one of the color processing module fingerprints.

13. A computer program product, tangibly stored on a computer-readable medium, for generating a plurality of color processing module fingerprints, comprising instructions operable to cause a programmable processor to:

use a plurality of color processing modules to generate from a set of input colors represented in an input color space a plurality of sets of output colors represented in an output color space, wherein each set of output colors represents a respective one of the plurality of color processing modules;

test the plurality of sets of output colors to determine whether each set of output colors can uniquely identify the color processing module that was used to generate that set of output colors, thereby acting as a color processing fingerprint; and until each set of output colors can uniquely identify the color processing module that was used to generate that set of output colors to:

add a new color to the set of input colors; and use the plurality of color processing modules to regenerate the plurality of sets of output colors from the set of input colors; and retest the plurality of sets of output colors to determine whether each set of output colors can uniquely identify the color processing module that was used to regenerate that set of output colors.

14. The product of claim 13, wherein the initial set of input colors is a random set of colors sampling the input color space.

15. The product of claim 13, wherein the set of input colors used to generate the plurality of sets of color processing fingerprints is a fingerprint generating set.

16. The product of claim 15, wherein the fingerprint generating set comprises the smallest set of input colors that can generate a color processing module fingerprint for each of the plurality of color processing modules.

17. The product of claim 15, wherein the fingerprint generating set only comprises colors from the set of input colors that are not identically transformed by each of the plurality of color processing modules.

18. The product of claim 13, wherein the color processing modules are color management modules.

19. A computer program product, tangibly stored on a computer-readable medium, for identifying a computer application's color processing module, comprising instructions operable to cause a programmable processor to:

receive a fingerprint generating set and a plurality of color processing module fingerprints;

generate a test color set by transforming the fingerprint generating set using the application's color processing module; and identify the application's color processing module by comparing the generated test color set with the plurality of color processing module fingerprints.

20. The product of claim 19, wherein the instructions to identify the application's color processing module comprises instructions to find an exact match between the test color set and one of the color processing module fingerprints.

21. The product of claim 19, wherein the instructions to identify the application's color processing module comprises instructions to find a best match between the test color set and one of the color processing module fingerprints.

22. The product of claim 21, wherein the instructions to find a best match between the test color set and one of the color processing module fingerprints comprises instructions to find a minimum Euclidean distance between the test color set and one of the color processing module fingerprints.

23. The product of claim 19, wherein the instructions to identify the application's color processing module comprises instructions to determine whether each color in the test color set has a color value that lies within a predetermined tolerance from the color value of a corresponding color in one of the color processing module fingerprints.

24. The product of claim 23, wherein the predetermined tolerance is a single digital count on either side of the color value of the corresponding color in one of the color processing module fingerprints.

* * * * *

UNITED STATES PATENT AND TRADEMARK OFFICE
CERTIFICATE OF CORRECTION

PATENT NO. : 6,798,904 B2
DATED : September 28, 2004
INVENTOR(S) : Lars U. Borg

It is certified that error appears in the above-identified patent and that said Letters Patent is hereby corrected as shown below:

Column 7,
Line 38, delete "claims" and insert -- claim --;

Column 8,
Line 7, delete "and".

Signed and Sealed this

Eighth Day of February, 2005

JON W. DUDAS
*Director of the United States Patent and Trademark Office*